United States Patent
Li et al.

(10) Patent No.: US 10,832,036 B2
(45) Date of Patent: Nov. 10, 2020

(54) META-LEARNING FOR FACIAL RECOGNITION

(71) Applicant: ADOBE INC., San Jose, CA (US)

(72) Inventors: Haoxiang Li, San Jose, CA (US); Zhe Lin, Fremont, CA (US); Muhammad Abdullah Jamal, Oviedo, FL (US)

(73) Assignee: ADOBE INC., San Jose, CA (US)

( * ) Notice: Subject to any disclaimer, the term of this patent is extended or adjusted under 35 U.S.C. 154(b) by 106 days.

(21) Appl. No.: 16/036,757

(22) Filed: Jul. 16, 2018

(65) Prior Publication Data
US 2020/0019758 A1 Jan. 16, 2020

(51) Int. Cl.
*G06K 9/00* (2006.01)
*G06N 3/08* (2006.01)

(52) U.S. Cl.
CPC ......... *G06K 9/00288* (2013.01); *G06N 3/084* (2013.01); *G06T 2207/20081* (2013.01); *G06T 2207/20084* (2013.01)

(58) Field of Classification Search
CPC ............... G06K 9/00288; G06N 3/084; G06T 2207/20084; G06T 2207/20081
See application file for complete search history.

(56) References Cited

U.S. PATENT DOCUMENTS

| | | | |
|---|---|---|---|
| 2016/0379041 A1* | 12/2016 | Rhee | G06K 9/00208 382/118 |
| 2017/0185897 A1* | 6/2017 | Droppo | G06F 11/0721 |
| 2018/0240011 A1* | 8/2018 | Tan | G06F 17/18 |

OTHER PUBLICATIONS

Finn et al, "Model-Agnostic Meta-Learning for Fast Adaptation of Deep Networks", May 9, 2017.*
Finn, Chelsea, Pieter Abbeel, and Sergey Levine. "Model-agnostic meta-learning for fast adaptation of deep networks." arXiv preprint arXiv:1703.03400 (2017).

* cited by examiner

*Primary Examiner* — Phuoc Tran
(74) *Attorney, Agent, or Firm* — Shook, Hardy & Bacon L.L.P.

(57) ABSTRACT

Methods and systems are provided for generating a facial recognition system. A facial recognition system can be implemented using a meta-model based on a trained neural network. A neural network can be trained as multiple classifiers that identify individuals using a small number of images of the individual's face. A meta-model can learn from the neural networks to be capable to identify an individual based on a small number of images. In this way, the facial recognition system uses the meta-model that learns from the neural network trained to identify an individual based on a small number of images. Such a facial recognition system is tested to determine any misidentification for fine-tuning the system. A facial recognition system implemented using such a meta-model is capable of adapting the model to learn identities entered into the system using only a small number of images to enroll an identity into the system.

20 Claims, 9 Drawing Sheets

META-LEARNING FOR FACIAL RECOGNITION

BACKGROUND

Oftentimes, it is desirable for a facial recognition system to be able to identify or recognize an individual from a given facial image. Creating a facial recognition system that can accurately identify individuals is a challenging task. Conventional facial recognition systems are typically trained such that the system learns to extract facial features for an individual that can then be used in the identification process. However, systems capable of identifying individuals from extracted facial features often requires a large number (e.g., hundreds or thousands) of examples of an individual's face in order to create a system capable of identifying the individual. Utilization of such an extensive amount of example faces is computationally inefficient. Further, because these systems use a pre-trained model based on extracted facial features, the model is not adaptive for identifying new individuals. For example, a system trained using a model generated using celebrity individuals with a large number of face examples will be ineffective for identifying a new individual input into the system using only a small number of face examples. Because of the limited number of facial examples, when deployed, the resulting systems often are not fine-tuned for accurately identifying the new individual. As such, facial recognition systems deployed using conventional approaches often suffer from overfitting, leading to performance degradation and misidentification during the identification process.

SUMMARY

Embodiments of the present disclosure are directed towards a system trained to identify an individual given a small number of face examples (e.g., one or two). One method available for creating such a system is using model-agnostic meta-learning. Meta-learning, or learning to learn, allows a model (e.g., meta-model) to be trained using learning algorithms such that the model learns how to better learn and perform a task. In this way, a meta-model can learn to effectively solve the specific learning problem of facial identification given only as small number of face examples per individual enrolled in a facial recognition system.

One method available for creating such a meta-model uses a neural network to learn a classifier adaptable for identifying individuals based on an image of the individual's face. Specifically, a neural network can be trained using classifiers that identify individuals using facial image(s) (e.g., a neural network can be trained using a first classifier to identity a first individual, a second classifier to identity a second individual, etc.). The neural network can be trained to perform multiple classifications by learning to identify individuals based on training using a small number of example images of an individual's face for each individual. Such a trained neural network can result in a meta-model that has learned from the classifiers. A facial recognition system can be implemented using such a meta-model that has learned to be capable to identify an individual based on a small number of images (e.g., one or two faces). In this way, the facial recognition system can use the trained meta-model to identify an individual based on a small number of images.

Such a facial recognition system implemented using a meta-model based on a trained neural network, for instance, a neural network can be trained to act as a high-quality binary classifier for identifying a particular individual based on an input image of the individual's face (e.g., input a face and output that the face belongs to Bob). Such a trained neural network can be used to implement a meta-model that learns to be able to classify individuals using only a small number of images. A meta-model trained using high-quality binary classifiers allows the meta-model to learn from the training of the neural networks and function as a high-quality classifier capable of identifying multiple individuals. Such a facial recognition system can be tested such that misidentification is determined and used to fine-tune the system. For instance, errors determined during testing can be used to improve the meta-model of the facial recognition system by backwards propagation of the errors to update the model. A facial recognition system implemented using such a meta-model is capable of adapting the model to learn each identity entered into the system using only a small number of images to enroll an identity into the system. In this way, the facial recognition system does not use the conventional approach of using extracted facial features from images to identify an individual. Instead, the facial recognition system uses an easily adaptable and robust classifier that uses weighted mathematical parameters of a neural network trained using meta-learning to be able to classify an image as an individual given only a few face examples (e.g., one or two).

DETAILED DESCRIPTION

Figure 1A:
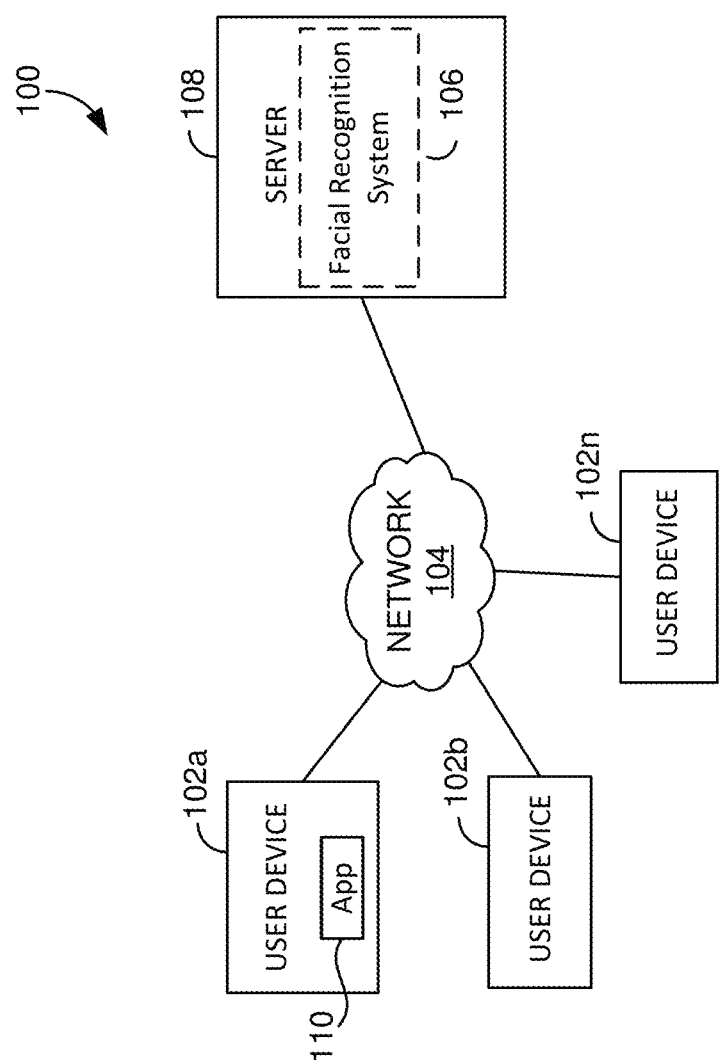
FIG. 1A depicts an example configuration of an operating environment in which some implementations of the present disclosure can be employed, in accordance with various embodiments.

Automated identification of an individual from a facial image is often a desired functionality. However, the number of facial images typically required to train a facial recognition system capable of accurately identifying an individual often may not be feasible. For example, an individual that is not a celebrity often does not have available the amount of facial images necessary for a system to learn the individual's facial features for use in identification. A user may attempt to utilize existing approaches generally relied upon to perform facial recognition, but when only a few images are used as examples for a system to learn an individual, such conventional approaches have difficulty identifying a given face from hundreds or thousands of identities. In particular, a neural network trained for facial recognition of a single individual using facial features extracted from a small number of images of the individual often results in overfitting and, thus, inaccurate identification. In this regard, such a conventional approach fails to be useful unless a significant amount of images can be utilized to train the system. As such, conventional methods are not successful in generating a system capable of accurately identifying individuals when trained using a small amount of examples of an individual's face.

Advantageously, using only a small amount of facial examples when training a facial recognition system reduces time and computational effort. In addition, generating a system capable of identifying an individual using only a few example faces allows for a more robust facial recognition system that can easily identify individuals that do not have a large number of images. Accordingly, embodiments of the present disclosure are directed to generating a facial recognition system implemented using a meta-model created using meta-learning. In this regard, a meta-model can be generated to implement the facial recognition system where the model is optimized using a neural network trained using classifiers based on a small number of face examples to learn an individual's face.

At a high-level, a facial recognition system can be implemented using a meta-model based on a trained neural network that learns from binary classifiers. Classifiers can be capable of identifying a particular individual from a face in an image. Specifically, multiple classifiers can be used to train a neural network. Such a classifier can train the neural network to learn an identity based on a facial example. This neural network can be trained using multiple classifiers to generate a meta-model such that the meta-model learns from the training iterations of the neural network. Advantageously, the meta-model learns from the training of the neural network such that the meta-model becomes highly effective as a classifier for identities given only a few face examples (e.g., one or two). The meta-model can also be validated using one or more new face(s) of one or more individual the network was previously trained to classify (e.g., a new face of an individual for which the parameters of the network have been updated). Such one or more new face(s) can come from a validation portion of the training dataset. Validation that the meta-model is accurately classifying face examples with a correct identity can be used to determine and refine the accuracy of the meta-model. The meta-model can then be updated for any inaccuracies based on errors between output from the meta-model and an expected output (e.g., ground truth output). As such, the meta-model is not trained to extract discriminative features but to be adaptive and well adjusted for classifying individual identities. In implementations, such a meta-model learns from the trained neural network to be able to identify an individual using only a few face examples for the model to learn the individual.

A meta-model generally refers to a model trained based on a variety of learned tasks such that the meta-model learns to quickly solve a new task using the previously learned tasks. In implementations, a neural network can be trained to perform one or more tasks (e.g., classification or one or more individuals). A neural network generally refers to a computational approach using large clusters of connected neurons. Neural networks are self-learning and trained rather than explicitly programmed so that a generated output reflects a desired result.

As described herein, a neural network can be trained to perform the task of classification of an individual based on facial recognition. In this way, a neural network can receive a face example and indicate whether the face belongs to a particular individual the network has been trained to classify. Training such a neural network can use input images (e.g., a few facial examples of the individual the network is being trained to identify). An input image can be run through a neural network such that the neural network outputs a classification of the individual whose face is in the input image. Errors in the output classification output by the network can be determined (e.g., binary cross entropy loss) such that the errors can be fed back through the network to appropriately train the network. For instance, errors can be corrected by adjusting weights of network connections (e.g., adjusting weights of network parameters) to reduce the value of the error. In this way, the network architecture can remain the same, but the weights of the network parameters can be retrained during an iteration of training to reduce errors. For instance, a network trained to classify Bob will identify whether an input facial image belongs to Bob or not (e.g., output: "this is Bob" or "this is not Bob"). Neural network training can take place for additional iterations to generate a predefined number of classifiers for identifying individuals using facial recognition.

Training a neural network to classify an individual results in updates to a meta-model such that the model learns from the neural network classifier. An updated meta-model can then be evaluated using a validation portion of the training set. Validation can be used to improve the facial recognition of individuals using the meta-model by inputting a new face (e.g., a new face of an individual the neural network was previously trained to classify such that there are trained parameters for the individual in the network) into the facial recognition system run using the meta-model. The model can then be updated for any loss (e.g., classification of the new face of an individual using the model). In this way, validation can be used to determine whether the meta-model of the facial recognition system performs well or not. When there are errors in the classification output by the model, the errors can be used to update the model. The process of training the model can be repeated until the error is small enough such that the output (e.g., classification) reaches a desired threshold minimum of loss.

Such training and validation can take place in batches run in parallel. During a batch of training and validation, the neural network can be trained for one or more classifier(s) such that a parameter(s) of the network are updates for the classifier(s) from an initial state. During validation, the network can be used to sample new examples for the classifier(s) (e.g., a new face(s) of the individual used to train the network) and calculate validation loss—for instance validation losses for each classifier in the batch. Such a process can be performed in parallel for each classifier in a single batch. After completion of training the batch, validation losses for each task in a single batch (e.g., the sum of validation losses) can then be used to update the network from the initial state. After such an update, the updated state becomes the initial state and further training and validation can be performed.

The meta-model can further undergo testing to fine tune the model. An input image (e.g., facial image of a new individual) can be run through the facial recognition system run using the meta-model such that the system outputs a classification of the image (e.g., system classifies an image using a label, such as a name of an individual). Errors in the classification output by the system can be determined such that the errors can be fed back through the system to appropriately train the system. The process of training the system can be repeated until the system converges to a state where the error is small enough such that the output (e.g., classification) reaches a desired threshold minimum of loss.

The process of training the neural network using classifiers used to generate the meta-model, validating the meta-model, and testing the facial recognition system can be repeated for a sufficiently large number of cycles, until the system converges to a state where the error is small enough such that the output (e.g., classification) output reaches a desired threshold minimum of loss.

Specifically, in one embodiment, to generate the meta-model, a deep convolutional neural network face recognition model can be used. The deep face recognition model can be expressed by $f$ which is parameterized by $\theta$. During training, the network can be trained to perform various tasks that can be considered as binary classification problems. Each task (e.g., a binary classification task and/or a classifier for identifying an individual) has training samples and validation samples that correspond to face identities. For instance, one face identity can be considered as a positive identity and the remaining face identities can be considered as negative identities. Such labeled examples of a training set can be denoted by $\{(x_k, y_k); y_k \in \{0,1\}\}_{k=1}^{K}$. The distribution of tasks and/or classifiers $p(\mathcal{T})$ can be considered what the model is being trained to adapt to during meta-learning. During learning, the model can be trained on a number of tasks and/or classifiers. A first task and/or classifier can be $\mathcal{T}_i$ from $p(\mathcal{T})$. During training, the model (e.g., neural network) learns from $\mathcal{T}_i$ and can then be tested on new samples drawn from $\mathcal{T}_i$. The face recognition model $f$ can then be improved by improving for error based on new data with respect to $\theta$. In this way, errors during testing can be considered training error of the meta-learning process.

When adapting the model to a new task and/or classifier $\mathcal{T}_i$, the $\theta$ becomes $\theta_i$. In embodiments, there can be only one gradient step for the adaptation of the model using $K$ examples of task and/or classifier $\mathcal{T}_i$. The updated parameter using the gradient can be defined as:

$$\theta_i \leftarrow \theta - \alpha \nabla_\theta \mathcal{L}_{\mathcal{T}i}(f_\theta)$$

Where $\alpha$ can be a learning rate which can be fixed and/or learned. $\mathcal{L}_{\mathcal{T}i}$ can be a binary cross entropy loss of task and/or classifier $\mathcal{T}_i$ which is defined as:

$$\mathcal{L}_{\mathcal{T}i}(f_\theta) = -\sum_{(x^j, y^j) \sim \mathcal{T}_i} y^j \log f_\theta(x^j) + (1-y^j)\log(1-f_\theta(x^j))$$

The model parameter $\theta$ can be optimized using an objective function which can be computed using $\theta_i$ parameters. In this way, the meta-model parameters can be updated as follows:

$$\theta \leftarrow \theta - \beta \nabla_\theta \sum_{\mathcal{T}i \sim p(\mathcal{T})} \mathcal{L}_{\mathcal{T}i}(f_{\theta i})$$

Where $\beta$ can be the meta step size.

In this way, the neural network can be comprised of a plurality of interconnected nodes with a parameter, or weight, associated with each node. While individual parameters are not specified during training of the neural network, the network can learn, for example, parameters that relate to the input image of an individual's face and the associated classifier being learned. Examples of such parameters can include identifying edge detection, RGB color, textures of features, image characteristics, etc. In operation, each node can receive inputs from multiple other nodes and be activated based on a combination of all these inputs, for example, when the sum of the input signals is above a threshold. A parameter can amplify or dampen these input signals. The inputs from each node can be weighted by a parameter, or in other words, multiplied by the parameter, prior to being summed. For example, a parameter can have a value between zero and one (e.g., a weighted mathematical parameter). In this way, the parameters can control the strength of a connection between each node and the subsequent node. As such, during training, the weights of the parameters of the network can be updated to generate a robust classifier that is capable of being easily adaptive and well adjusted for classifying individual identities given only a few face examples (e.g., one or two).

Creating a facial recognition system using a meta-model capable of identifying individuals using only a few facial images of an individual during training, as described herein, allows for a well-adjusted model upon deployment because training mirrors deployment. Advantageously, such training results in an adaptive and adjusted system for each identity upon deployment. Training in this manner ensures that the system needs only one or two facial images to enroll an individual in the trained system. Conventional facial recognition systems typically require a multitude of images, allowing discriminative features to be extracted and learned for use in identifying an individual. Obtaining the number of such images to adequately train a system in the conventional manner is time-intensive and requires significant computational resources. The present disclosure is advantageous in that the meta-model that implements the facial recognition system is highly accurate, even when only one or two examples of an individual's face is used to enroll an individual into the system. Such a facial recognition system allows an enrolled individual to be identified from additional (e.g., unknown) facial images.

FIG. 1A depicts an example configuration of an operating environment in which some implementations of the present disclosure can be employed, in accordance with various embodiments. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 8.

It should be understood that operating environment 100 shown in FIG. 1A is an example of one suitable operating environment. Among other components not shown, operating environment 100 includes a number of user devices, such as user devices 102a and 102b through 102n, network 104, and server(s) 108. Each of the components shown in FIG. 1A may be implemented via any type of computing device, such as one or more of computing device 800 described in connection to FIG. 8, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 8. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1A. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 108 in carrying out facial recognition of an individual in an image. In some implementations, the application(s) comprises a web application, which can run in a web browser, and could be hosted at least partially on the server-side of environment 100. In addition, or instead, the application(s) can comprise a dedicated application, such as an application having image processing functionality. In some cases, the application is integrated into the operating system (e.g., as a service). It is therefore contemplated herein that "application" be interpreted broadly.

In accordance with embodiments herein, the application 110 can facilitate facial recognition. In some cases, a user can select or input an image. An image can be selected or input in any manner. For example, a user may take a picture using a camera function on a device. As another example, a user may select a desired image from a repository, for example, stored in a data store accessible by a network or stored locally at the user device 102a. In other cases, an image may be automatically selected or detected (e.g., from a webpage or augmented reality environment). Based on the input image, (e.g., provided via a user device or server), facial recognition can be performed and a name for an individual (or other identifier) in the input image can be provided, for example, to the user via the user device 102a. In this regard, the identified individual's name can be displayed via a display screen of the user device. As can be appreciated, in some cases, additionally or alternatively, identification may not be presented but rather utilized (e.g., by a service) to provide other information or perform a function.

As described herein, server 108 can facilitate facial recognition of an individual in an image via facial recognition system 106. Server 108 includes one or more processors, and one or more computer-readable media. The computer-readable media includes computer-readable instructions executable by the one or more processors. The instructions may optionally implement one or more components of facial recognition system 106, described in additional detail below.

Facial recognition system 106 can train and operate a meta-model capable of classifying a face in an image (e.g., assign a name to a face in an image). Such a meta-model can be generated from one or more neural networks trained to classify an individual in an image. For example, a facial recognition system can include a meta-model that learns to identify individuals from the training of a neural network capable of classifying individuals (e.g., a meta-model learns to classify individuals using a neural network trained to classify a first individual, trained to classify a second individual, etc.). When training a neural network to become a classifier for an individual, a few example facial images (e.g., one or two) can be used. Using only a small number of facial image examples to train a neural network, from which a meta-model learns, allows the meta-model to produce high-quality classifiers for an identity given only a few face examples. In this way, the meta-model is adaptive and adjusted for each identity input into a facial recognition system during deployment of the system. Such a facial recognition system can implement a meta-model trained using a neural network trained to classify an individuals.

For cloud-based implementations, the instructions on server 108 may implement one or more components of facial recognition system 106, and application 110 may be utilized by a user to interface with the functionality implemented on server(s) 108. In some cases, application 110 comprises a web browser. In other cases, server 108 may not be required. For example, the components of facial recognition system 106 may be implemented completely on a user device, such as user device 102a. In this case, facial recognition system 106 may be embodied at least partially by the instructions corresponding to application 110.

Thus, it should be appreciated that facial recognition system 106 may be provided via multiple devices arranged in a distributed environment that collectively provide the functionality described herein. Additionally, other components not shown may also be included within the distributed environment. In addition, or instead, facial recognition system 106 can be integrated, at least partially, into a user device, such as user device 102a. Furthermore, facial recognition system 106 may at least partially be embodied as a cloud computing service.

Figure 1B:
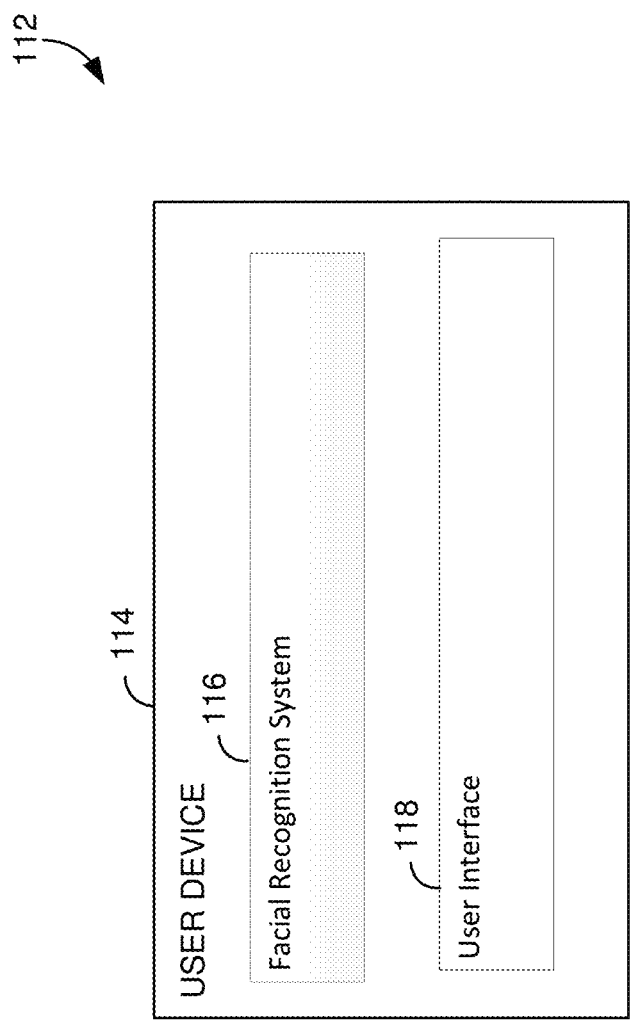
FIG. 1B depicts an example configuration of an operating environment in which some implementations of the present disclosure can be employed, in accordance with various embodiments.

Referring to FIG. 1B, aspects of an illustrative facial recognition system are shown, in accordance with various embodiments of the present disclosure. FIG. 1B depicts a user device 114, in accordance with an example embodiment, configured to allow for identifying individuals using a facial recognition system. The user device 114 may be the same or similar to the user device 102a-102n and may be configured to support the facial recognition system 116 (as a standalone or networked device). For example, the user device 114 may store and execute software/instructions to facilitate interactions between a user and the facial recognition system 116 via the user interface 118 of the user device.

A user device can be utilized by a user to perform facial recognition. In particular, a user can select and/or input an image to identify an individual utilizing user interface 118. An image can be selected or input in any manner. The user interface may facilitate the user accessing one or more stored images on the user device (e.g., in a photo library), and/or import images from remote devices and/or applications. As can be appreciated, images can be input without specific user selection. Based on the input and/or selected image, facial recognition system 116 can be used to perform facial recognition of an individual in the image using various techniques, some of which are further discussed below. User device 114 can also be utilized for displaying the identification using facial recognition.

Figure 2:
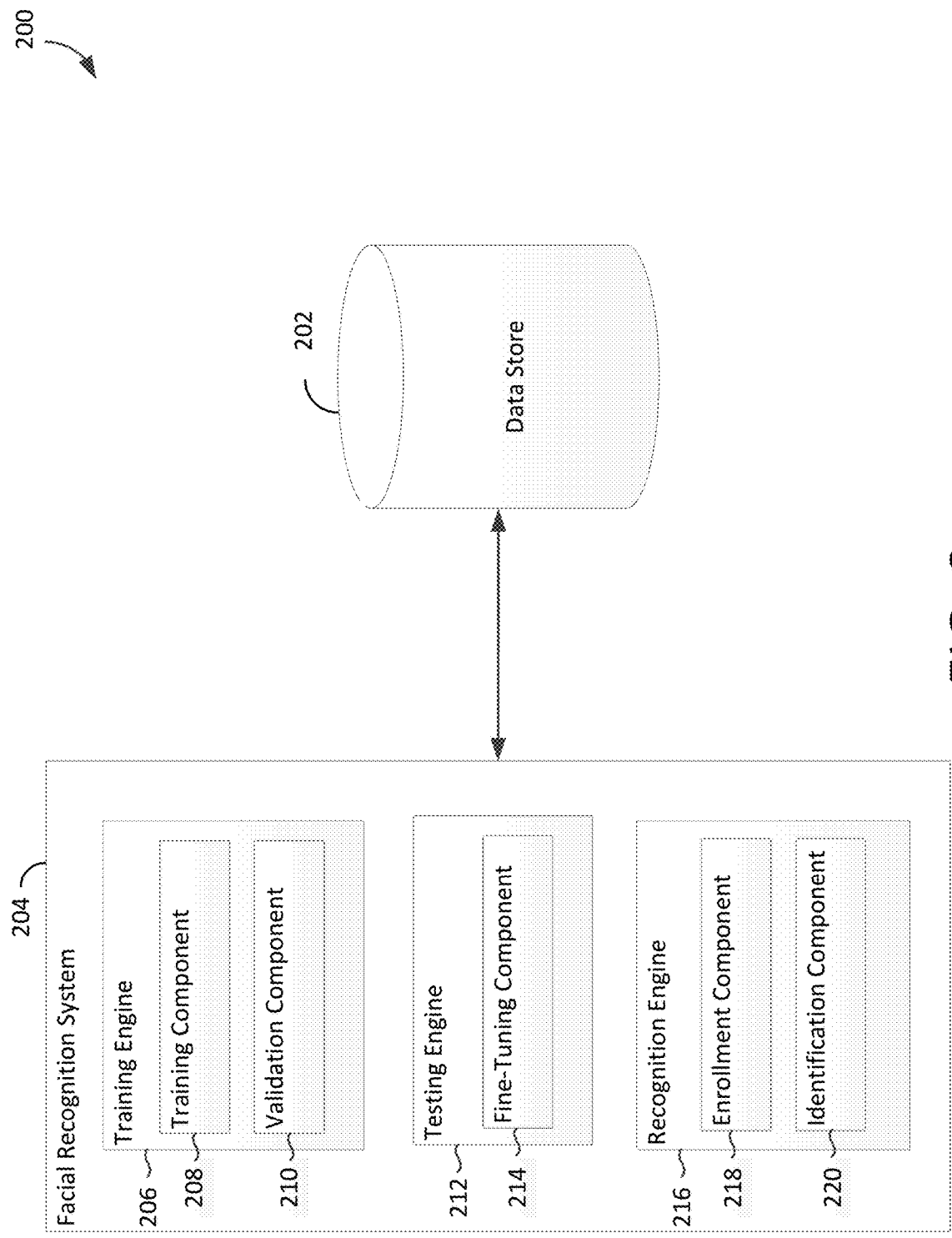
FIG. 2 depicts an example configuration of an operating environment in which some implementations of the present disclosure can be employed, in accordance with various embodiments of the present disclosure.

Referring to FIG. 2, aspects of an illustrative facial recognition environment 200 are shown, in accordance with various embodiments of the present disclosure. Facial recognition system 204 includes training engine 206, testing engine 212, and recognition engine 216. The foregoing engines of facial recognition system 204 can be implemented, for example, in operating environment 100 of FIG. 1A and/or operating environment 112 of FIG. 1B. In particular, those engines may be integrated into any suitable combination of user devices 102a and 102b through 102n and server(s) 106 and/or user device 114. While the various engines are depicted as separate engines, it should be appreciated that a single engine can perform the functionality of all engines. Additionally, in implementations, the functionality of the engines can be performed using additional engines and/or components. Further, it should be appreciated that the functionality of the engines can be provided by a system separate from the facial recognition system.

As shown, a facial recognition system can operate in conjunction with data store 202. Data store 202 can store computer instructions (e.g., software program instructions, routines, or services), data, and/or models used in embodiments described herein. In some implementations, data store 202 can store information or data received via the various engines and/or components of facial recognition system 204 and provide the engines and/or components with access to that information or data, as needed. Although depicted as a single component, data store 202 may be embodied as one or more data stores. Further, the information in data store 202 may be distributed in any suitable manner across one or more data stores for storage (which may be hosted externally). In embodiments, data stored in data store 202 can include images used for training facial recognition system. Such images can be input into data store 202 from a remote device, such as from a server or a user device.

In embodiments, data stored in data store 202 can include a dataset used for training a facial recognition system. Such a dataset can be split into training data (e.g., a training set) and testing data (e.g., a testing set). The training data generally refers to data used to train a facial recognition system, or portion thereof. A training set can be split into training portion and validation portion. The training portion can generally be used to train a neural network as binary classifiers capable of identifying whether a facial image belongs to a particular individual. The validation portion can generally be used to validate a meta-model based on the trained neural network. Validation can indicate whether there is an error in identifying a particular individual when running the facial recognition system. The testing data can generally be used for fine-tuning the meta-model used to implement the facial recognition system.

In some cases, data can be received by facial recognition system 204 from user devices (e.g., from user device 202a or another device associated with a user, via, for example, application 210). In other cases, data can be received from one or more data stores in the cloud. In yet other cases, data can be received from a server. Data store 202 can also be used to store a trained neural network used to generate a meta-model, as well as the meta-model itself that can be used to implement the facial recognition system.

Facial recognition system 204 can generally be used for classifying individuals in images using facial recognition. Specifically, the facial recognition system can implement a meta-model that learns to identify individuals using classifiers based on a trained neural network. In this way, the meta-model learns from a neural network trained to identify individuals using classifiers. Upon completion of training, the neural network as a classifier, the meta-model is updated. The meta-model can be validated to determine accuracy of identification using a new image of an individual that the meta-model is familiar with (e.g., an individual the neural network was previously trained to identify). Further, the meta-model can be fine-tuned by testing the facial recognition systems ability to identify an individual the meta-model is not familiar with (e.g., an individual the neural network was not previously trained to identify). Iterations of training and testing can be performed until a particular threshold of performance is met by the facial recognition system.

Training engine 206 can be used to train a meta-model for identifying individuals entered into a facial recognition system. The meta-model can learn to identify individuals using a neural network trained to produce classifiers that identify individuals. Such a trained neural network can then be used to implement a meta-model capable of learning to classify whether a face in an image belongs to a particular individual.

As depicted in FIG. 2, training engine 206 can utilize training component 208 and validation component 210 during the training of a meta-model used to implement a facial recognition system. While the various components are depicted as separate components, it should be appreciated that a single component can perform the functionality of all components. Additionally, in implementations, the functionality of the components can be performed using additional components and/or engines. Further, it should be appreciated that the functionality of the components can be provided by a system separate from the facial recognition system.

Training component 208 can be used to train a neural network from which a meta-model can learn a more effective and efficient facial recognition process. To train the neural network, an image can be input such that the network learns to output a classification of whether a face in the image belongs to a particular individual or not. Errors in the output classification generated by the network can be determined such that the errors can be fed back through the network to appropriately train the network. Errors can be determined by comparing an output from the neural network against a ground-truth output. Ground-truth generally refers to an expected output based on a specific input that a neural network should generate when the network is correctly performing the task it is being trained to perform (e.g., a facial image is input, the output is that the face in the image belongs to Bob, the ground-truth is that the face does not belong to Bob). Upon determining errors in the network during an iteration of training a network based on the ground-truth comparison, the errors can be used to adjust the weight of network parameters to reduce the value of the error. In this way, the network architecture can remain the same during training iterations, but the weights of the network parameters can be retrained (e.g., updated) during an iteration of training to reduce errors. In an embodiment, the process of training the network can be repeated such that the network is trained using one or two face examples. Such training can take place for additional individuals to train the neural network for a predefined number of classifiers for identifying individuals using facial recognition.

Upon completion of an iteration of training the neural network to classify an individual, the meta-model is updated. For instance, upon completion of training for identifying a first individual, the meta-model learns from the training of that classifier for the first individual. As one or more additional iterations of training the neural network is completed, the meta-model is updated. In this way, such a meta-model compilate the training the neural network to become an adaptive model (e.g., classifier) for any identity entered into a facial recognition system.

Validation component 210 can be used to validate a meta-model based on the trained neural network (e.g., the neural network trained by training component 208). In this way, upon successfully training a neural network to classify one or more individuals, the neural network can be used to run a meta-model such that the model learns from the trained neural network classifier. As the meta-model is updated using a trained neural network, the updated meta-model (e.g., the trained neural network) can be evaluated for accuracy in identification of individuals based on facial recognition. Validation can be used to improve the facial recognition of individuals using the meta-model by inputting a new face (e.g., a variation of an individual's face not used during training) and updating the model for any loss (e.g., classification of the new face of an individual using the model). Loss can be determined by comparing an output classification by the facial recognition system implemented using the meta-model with a ground-truth output (e.g., a facial image is input, the output is that the face in the image belongs to Bob, the ground-truth is that the face belongs to Tony). In an embodiment, a binary entropy loss function can be used to determine errors. Upon determining errors in the model during an iteration of validation, the errors can be used to adjust the model to reduce the value of the error. The process of training and validating the model can be repeated until the error is small enough such that the output (e.g., classification) reaches a desired threshold minimum of loss.

Testing engine 212 can be used to fine-tune a meta-model based on a trained neural network (e.g., the neural network trained and validated by training engine 206). A meta-model based on a trained neural network capable of classifying individuals using facial recognition can further undergo testing to fine-tune the model. An input image (e.g., facial image of a new individual not previously identified) can be run through the facial recognition system implemented using the meta-model such that the system outputs a classification of the image (e.g., name of an individual in the image). Errors in the classification output by the system can be determined such that the errors can be fed back through the system to appropriately train the system. Errors can be determined by comparing an output classification by the facial recognition system implemented using the meta-model with a ground-truth output (e.g., a facial image is input, the output is that the face in the image belongs to Bob, the ground-truth is that the face belongs to Bob). The process of training and testing the system can be repeated until the system converges to a state where the error is small enough such that the output reaches a desired threshold minimum of loss (e.g., accuracy of classification reaches a predetermined level).

As depicted in FIG. 2, recognition engine 216 can utilize enrollment component 218 and identification component 220 to use a facial recognition system. While the various components are depicted as separate components, it should be appreciated that a single component can perform the functionality of all components. Additionally, in implementations, the functionality of the components can be performed using additional components and/or engines. Further, it should be appreciated that the functionality of the components can be provided by a system separate from the facial recognition system.

Upon completion of training and testing of the meta-model of facial recognition system 204, recognition engine 216 can be used to run the meta-model when receiving an input image of an individual to identify (e.g., from a user at a user device). Enrollment engine 218 can be used to enroll faces (e.g., one or two) for individuals into the facial recognition system. Given the faces for individuals used to enroll the individuals into the facial recognition system, the meta-model can be utilized to generate binary classifiers such that a face can be evaluated by the binary classifiers and predictions of the classifiers can be max-pooled to recognize the individual (e.g., the individual that the face belongs to). In this way, upon enrollment of the faces into the system, a trained and tested meta-model can be used to identify individuals in images input into the system using the meta-model.

Identification component 220 can receive an image for facial recognition. The image can be selected for input using techniques including a touch screen, a stylus, a mouse, and/or a track pad. In other embodiments, a user can input the image by inputting a link or URL to an image. Alternatively, a user can select an image from a group of images stored in a database, such as data store 202. Upon an image being received, the facial recognition system can be implemented using the trained and tested meta-model to identify the individual in the image using the previously enrolled faces.

Figure 3:
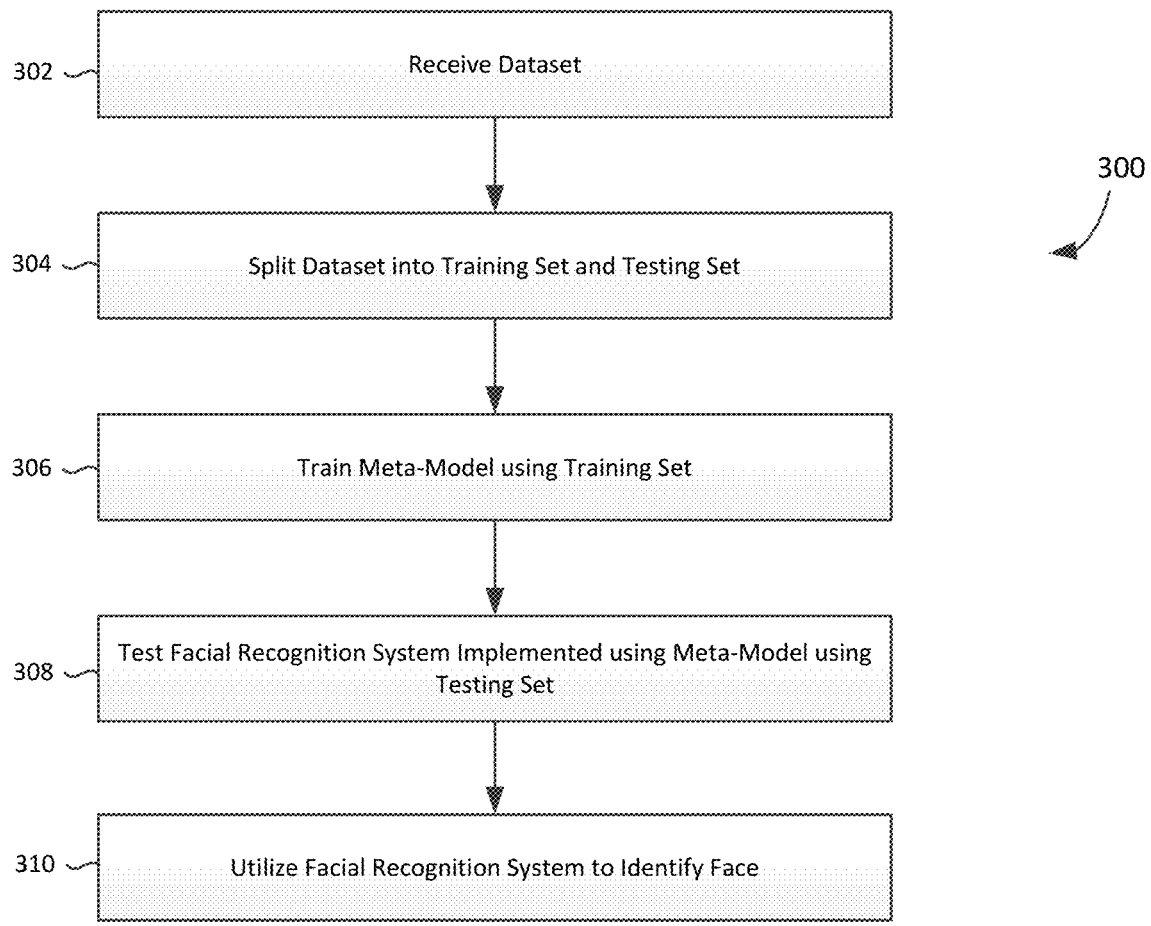
FIG. 3 depicts process flow is provided showing an embodiment of a method for training and utilizing a facial recognition system, in accordance with embodiments of the present disclosure.

With reference to FIG. 3, a process flow is provided showing an embodiment of method 300 for training and utilizing a facial recognition system, in accordance with embodiments of the present disclosure. Aspects of method 300 can be performed, for example, by training engine 206, testing engine 212, and/or recognition engine 216, as illustrated in FIG. 2.

At block 302, a dataset can be received for use in training and testing a facial recognition system. For example, the dataset can be taken from an online depository. In other embodiments, the dataset can be stored on a local system. Such a dataset can include images used for training facial recognition system. In embodiments, the dataset can include training data and testing data. As such, at block 304, the dataset can be split into a training set and a testing set. Training data of the training set generally refers to data used to train a facial recognition system, or portion thereof and can include a training dataset and a testing dataset. The training set can generally be used to train a neural network for use in implementing a meta-model. The testing set can generally be used for fine-tuning the meta-model.

At block 306, a meta-model can be trained using the training set. The training data of the training set can be split into a training portion and a validation portion. Such a training portion can include images for training the neural network along with corresponding ground-truth information. Ground-truth generally refers to an expected output based on a specific input that a neural network should generate when the network is correctly performing the task it is being trained to perform (e.g., a facial image is input, the output is that the face in the image belongs to Bob, the ground-truth is that the face does not belong to Bob). As such, training data can generally be used to train a neural network as a binary classifier capable of identifying whether a facial image belongs to a particular individual.

To train a neural network, an image from the training set can be input such that the network learns to outputs a classification of whether the image is a particular individual or not. Errors in the output classification can be fed back through the network to appropriately train the network. Errors can be determined by comparing an output from the neural network against a ground-truth output. Upon determining errors in the network during an iteration of training a network based on the ground-truth comparison, the errors can be used to adjust the weight of network parameters to reduce the value of the error. Such training using training data can take place for additional iterations of training the neural network to generate a predefined number of classifiers for identifying individuals using facial recognition.

Upon successfully training a neural network to classify one or more individuals, the meta-model based on the neural network is updated as the model learns from the trained neural network. Such a meta-model is adaptive for each identity entered into a facial recognition system. As the meta-model is updated using training iterations of the neural network, the updated meta-model can be evaluated for accuracy in identification of individuals based on facial recognition. Validation data can generally be used to evaluate the accuracy (e.g., validate) of the meta-model trained using the neural network. Validation can be used be performed using a new face from the validation data (e.g., a variation of an individual's face not used during training) and updating the model for any loss determined using corresponding ground truth (e.g., classification of the new face of an individual using the model). In this way, validation can indicate whether there are errors in identifying a particular individual using the facial recognition system such that the meta-model can be improved. Upon determining errors in the model during an iteration of validation, the errors can be used to adjust model to reduce the value of the error.

At block 308, a meta-model used to implement a facial recognition system can be tested using the testing set. Such testing can be used to fine-tune the meta-model based on the trained neural network capable of classifying an individual using facial recognition. An input image from the testing set (e.g., facial image of a new individual) can be run through the facial recognition system run using the meta-model such that the system outputs a classification (e.g., name of an individual) of the image. Errors in the classification output by the system can be determined such that the errors can be fed back through the system to appropriately train the system. Errors can be determined by comparing the output by the facial recognition system with a ground-truth output from the testing set.

Upon completion of training and testing of the facial recognition system, the system can be utilized to identify an individual using facial recognition, at block 310. In order to use the facial recognition system to identify individuals, faces of individuals can be enrolled into the system. For instance, one or two faces can be enrolled per individual. Because the facial recognition system is trained using a small number of face examples per individual, the system is easily adaptable upon deployment to enroll an individual in the system using a small number of face examples. Once an individual is enrolled in the system, the system can perform facial recognition for that individual to identify that individual's face in images input into the system. As such, upon receiving an image, the facial recognition system can be implemented using the trained and tested meta-model to identify the individual in the image using the previously enrolled faces.

Figure 4:
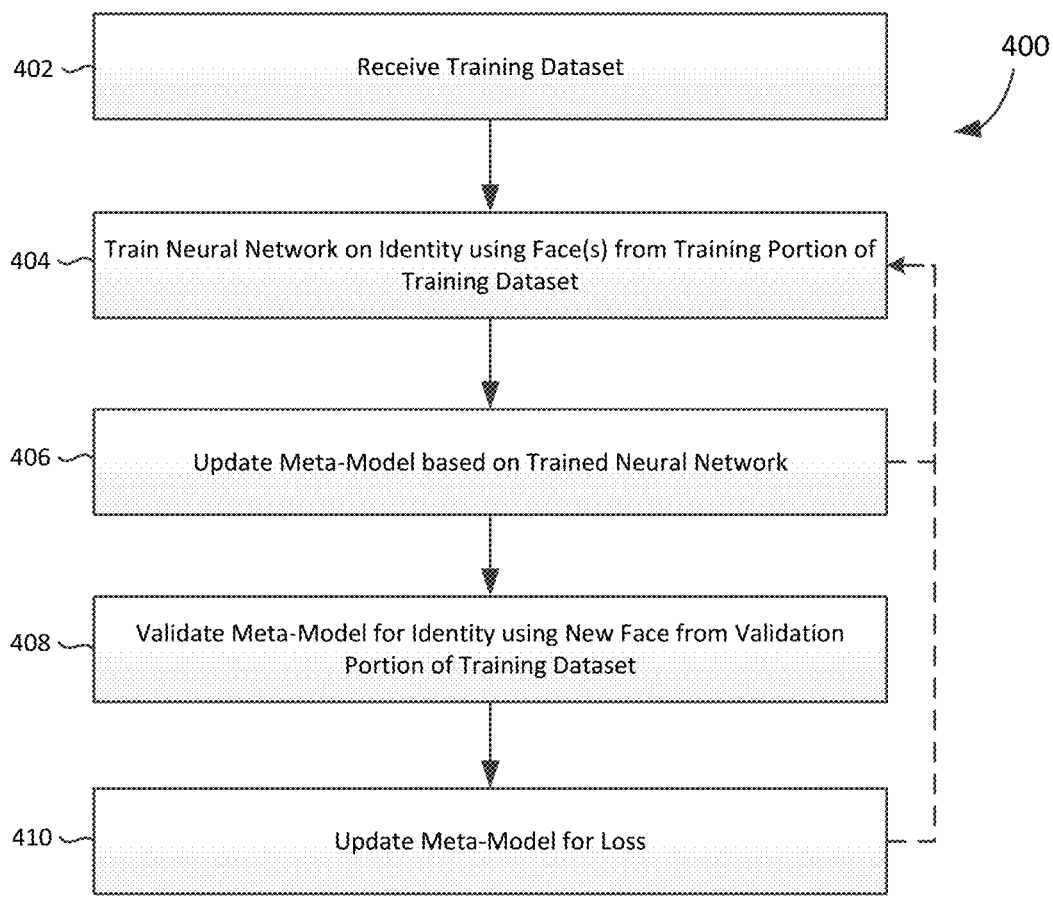
FIG. 4 depicts a process flow is provided showing an embodiment(s) of a method for generating a meta-model based on a neural network trained using classifiers for identifying individuals using facial recognition, in accordance with embodiments of the present disclosure.

With reference to FIG. 4, a process flow is provided showing an embodiment(s) of method 400 for training a meta-model based on a neural network trained as classifiers for identifying individuals using facial recognition, in accordance with embodiments of the present disclosure. Aspects of method 400 can be performed, for example, by training engine 206, as illustrated in FIG. 2.

At block 402, a training dataset can be received. The training dataset can be split into a training data portion and a validation data portion. The training data portion can include images for training a neural network along with corresponding ground-truth information for the images. Ground-truth generally refers to an expected output that a neural network should generate when the network is correctly performing the task it is being trained to perform (e.g., a facial image is input, the output is that the face in the image belongs to Bob, the ground-truth is that the face does not belong to Bob).

At block 404, a neural network can be trained for an identity using a face(s) from a training portion of a training dataset (e.g., the training dataset received at block 402). An identity can be selected from the training portion of the training dataset to train a neural network as a classifier for the identity. For example, the identity can have a few face examples (e.g., one or two) that be used to train the network. To train the neural network, an image from the training data can be input such that the network outputs a classification of whether the image is a particular individual or not. Errors in the output classification can be determined by comparing an output from the neural network against a ground-truth output. Such errors can be fed back through the network to appropriately update and train the network such that the network is capable of classifying whether a face in an image belongs to the identity the network is trained to classify. In embodiments, a neural network can be trained using two facial examples for the individual the neural network is being trained to classify. For instance, if a neural network is trained for the identity Fred, the network will learn to identify faces belonging to Fred (e.g., based on one or two facial examples of Fred).

At block 406, the trained neural network for classifying an individual can be used to update a meta-model such that the model can learn from the trained neural network classifier. In this way, a meta-model can compilate the training of the neural network to become a model that is adaptive for each identity entered into a facial recognition system. Blocks 404 and 406 can be repeated for a number of iterations before proceeding to block 408. In an embodiment, 100 identities with two facial examples each can be used at blocks 404 and 406.

When it is determined that method 400 should proceed to block 408, the meta-model is validated for an identity using a new face for an individual the neural network was previously trained for as a classifier. During validation, the meta-model can be evaluated for accuracy in identification of individuals based on facial recognition. The validation portion of the training dataset can generally be used to evaluate the accuracy of the meta-model. In this way, validation can be performed using a variation of an individual's face not used during training as an input into the facial recognition system. The facial recognition system can then output a classification for the face (e.g., perform facial recognition and identify the individual the face belongs to).

At block 410, the meta-model can be updated for loss using a comparison of the output of the facial recognition system and ground truth corresponding to the input image. Updating the meta-model for loss can be used to correct errors in identifying a particular individual using the facial recognition system such that the meta-model can be improved.

Blocks 404 to 410 can be repeated for additional iterations. Iterations of training can be repeated for a sufficiently large number of training cycles, until the facial recognition system converges to a state where errors fall below a predetermined threshold such that the output produced reaches a desired threshold minimum of loss between input images and output classification.

Figure 5:
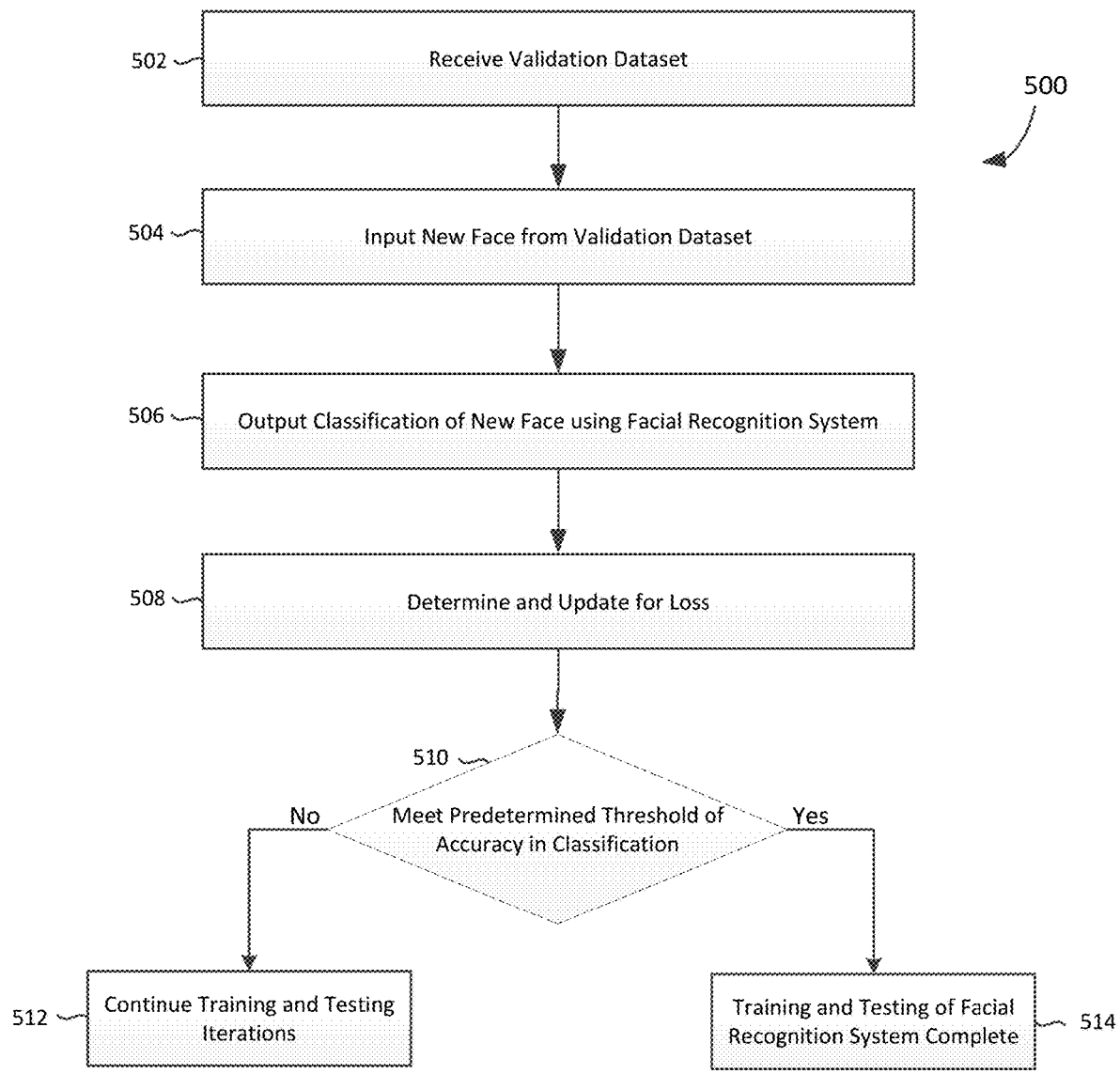
FIG. 5 depicts a process flow is provided showing an embodiment of a method for fine-tuning a meta-model used to implement a facial recognition system to identify individuals from facial images, in accordance with embodiments of the present disclosure.

Upon completion of generating of a meta-model, based on a trained neural network, used to run facial recognition system using method 400, further fine-tuning of the model can be performed (e.g., using method 500 discussed in regard to FIG. 5).

With reference to FIG. 5, a process flow is provided showing an embodiment of method 500 for fine-tuning a meta-model used to implement a facial recognition system to identify individuals from facial images, in accordance with embodiments of the present disclosure.

At block 502, a validation dataset can be received. The validation dataset can generally be used to validate a meta-model trained using the neural network. Validation can indicate errors in identifying a particular individual when running the facial recognition system. In this way, validation can be used to determine the accuracy of the meta-model in its current state.

At block 504, a facial image of a new individual can be input into the facial recognition system implementing a meta-model. This new face can belong to an individual a neural network was not previously trained to classify. As such, the meta-model is unfamiliar with the individual from the previously trained neural network used to update the meta-model.

At block 506, the facial recognition system can output a classification (e.g., name of an individual) for the image. At block 508, errors in the classification output by the system can be determined such that the errors can be fed back through the system to appropriately update and train the system. Loss can be determined by comparing an output classification by the facial recognition system implemented using the meta-model with a ground-truth output (e.g., a facial image is input, the output is that the face in the image belongs to Bob, the ground-truth is that the face belongs to Bob).

At block 510, when a predefined threshold of accuracy in classification is not met, the process of training and testing the system can be repeated at block 512. In an embodiment, when the predefined threshold of accuracy in classification is not met, the meta-model can undergo several iterations of learning (e.g., training) before the model undergoes validation again.

At block 510, when a predefined threshold of accuracy in classification is met, the process of training and testing (e.g., repeated iterations of training and testing) the system can be deemed complete at block 514. Such a threshold of accuracy can be met when the system has converged to a state where the error is small enough such that the output reaches a desired threshold minimum of loss (e.g., accuracy of classification reaches a predetermined level). In an embodiment, around 1000 iterations of training can be performed before testing of the meta-model to determine whether training of the meta-model is complete. To generate a meta-model that can successfully identify individuals, up to 30,000-40,000 iterations can be performed. A threshold of accuracy for output of the meta-model can be set so that upon reaching the threshold, the meta-model is deemed to have completed training.

Figure 6:
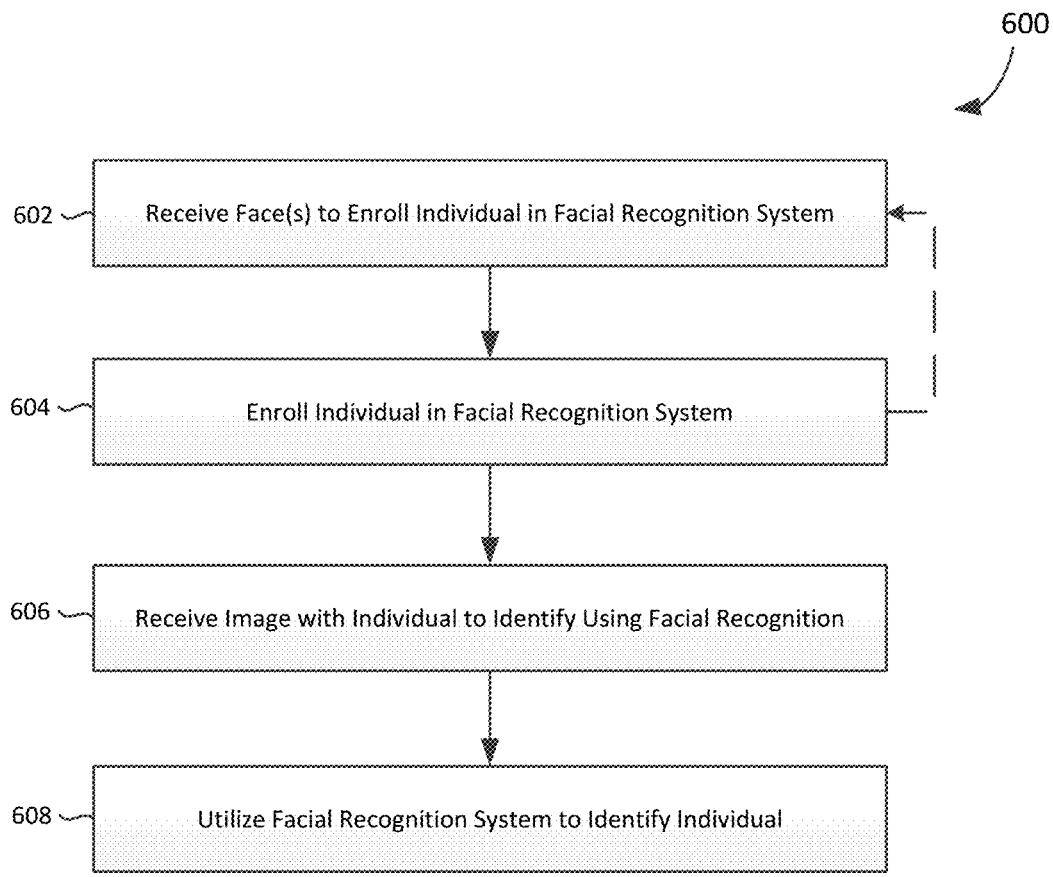
FIG. 6 illustrates a process flow is provided showing an embodiment of a method for utilizing a facial recognition system implemented using a meta-model to identify individuals from facial images, in accordance with embodiments of the present disclosure.

With reference to FIG. 6, a process flow is provided showing an embodiment of method 600 for utilizing a facial recognition system implemented using a meta-model to identify individuals from facial images, in accordance with embodiments of the present disclosure. Upon completion of training and testing of the facial recognition system, the system can be utilized to identify an individual using facial recognition. In order to use the facial recognition system to identify individuals, faces of individuals can be enrolled into the system such that the system can recognize and identify those individuals.

At block 602, a face can be received to enroll in a facial recognition system. For instance, one or two faces can be received for an individual. Because the facial recognition system is trained using a small number of face examples per individual, the system is easily adaptable upon deployment to enroll an individual in the system using a small number of face examples.

At block 604, an individual can be enrolled in the facial recognition system using received facial image(s). Once an individual is enrolled in the system, the system can perform facial recognition for that individual to identify that individual's face in images input into the system. As such, at block 606, an image with an individual to identify using a facial recognition system can be received. At block 608, the facial recognition system can be implemented using the trained and tested meta-model to identify the individual in the image using the previously enrolled faces.

Figure 7:
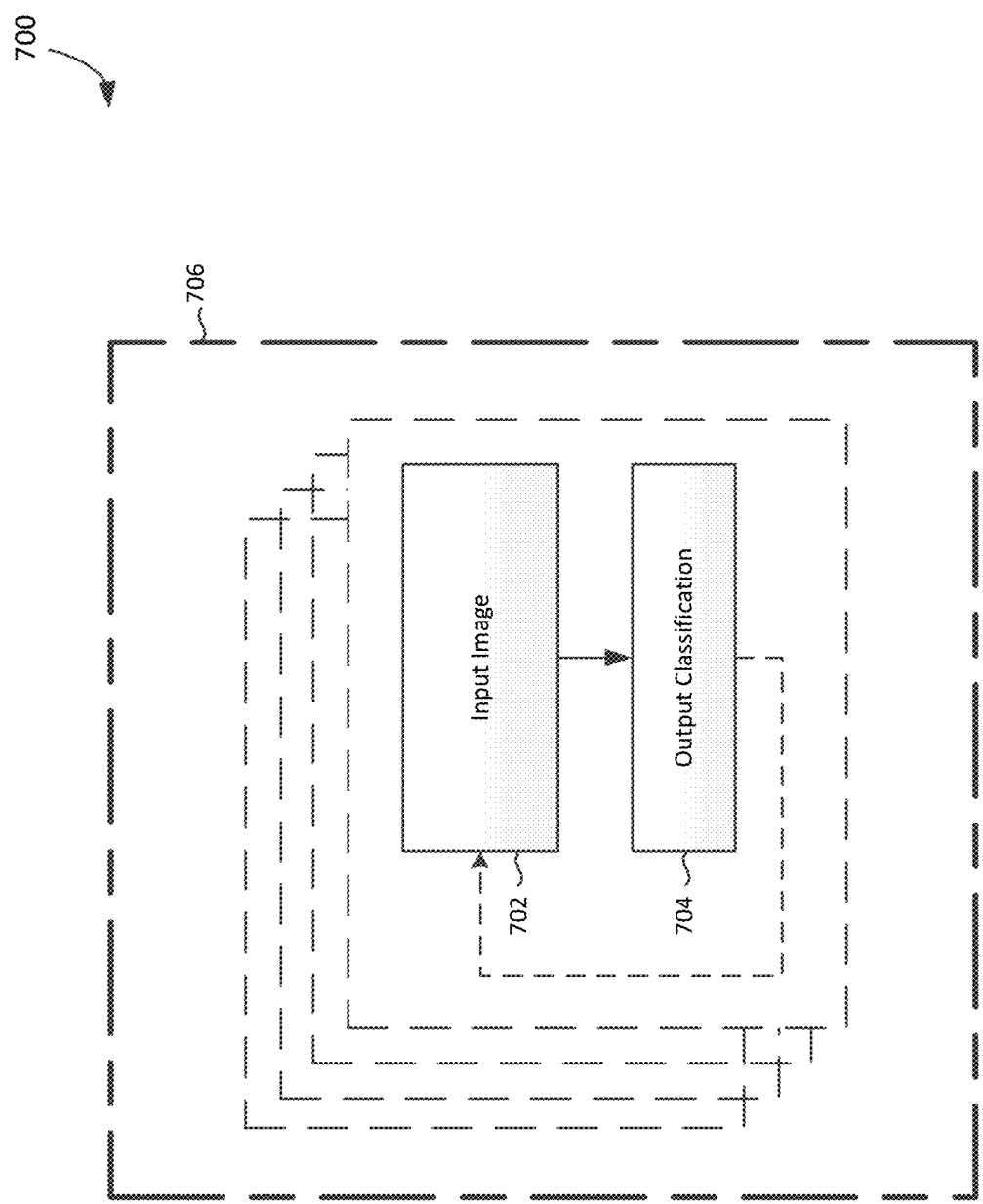
FIG. 7 illustrates an example environment that can be used for training a facial recognition system, in accordance with embodiments of the present disclosure, in accordance with embodiments of the present disclosure.

FIG. 7 illustrates an example environment 700 that can be used for training a facial recognition system, in accordance with embodiments of the present disclosure. Neural network 706 can be trained as classifiers capable of identifying whether a facial image belongs to a particular individual. Input image 702 can be input into the neural network and output classification 704 can be output. Any errors in the output classification can be used to update the neural network to more accurately identify the individual the network is being trained to classify. This process can be repeated until the neural network is capable of accurately classifying whether a facial image belongs to a particular individual. Advantageously, such training relies on using only a few (e.g., one or two) face examples when training the neural network. This training can be repeated for a number of iterations.

Completion of a training iteration of the neural network results in an update to a facial recognition system implemented using a meta-model, the meta-model based on the trained neural network. Such a meta-model can be based on the compilation of the training iterations of neural network 706 to become a model that is adaptive for each identity entered into the facial recognition system. As the meta-model is updated using additional neural network training iterations, the updated meta-model can be validated (e.g., evaluated for accuracy in identification of individuals based on facial recognition). Validation can be used be performed using a new face of an individual not used during training. In an embodiment, input image 702 can be this new face input into the facial recognition system implemented using the meta-model. The facial recognition system can output classification 704. Loss can be determined by comparing the output classification with ground truth corresponding to the input image. Upon determining errors in the model during an iteration of validation, the errors can be used to adjust neural network to reduce the value of the error.

In embodiments, the neural network 706 can be tested. Such testing can be used to fine-tune the meta-model based in the neural network. Input image 702 can be from a testing set of data (e.g., facial image of a new individual not used to train the neural network). The input image can be run through the meta-model run using neural network 706 to output a classification (e.g., name of an individual) for the image. Errors in the classification output can be determined such that the errors can be fed back through the system to fine-tune the network.

In further embodiments, upon completion of training and testing of the network, the meta-model based on neural network 706 can be utilized by a facial recognition system to identify an individual using facial recognition. In order to use the facial recognition system to identify individuals, faces of individuals can be enrolled into the system. Once an individual is enrolled in the system, the system can perform facial recognition for that individual to identify that individual's face in images input into the system. As such, in an embodiment, input image 702 is input into the facial recognition system implemented using the trained and tested meta-model. Output classification 704 can be the identity of the individual in the image.

Figure 8:
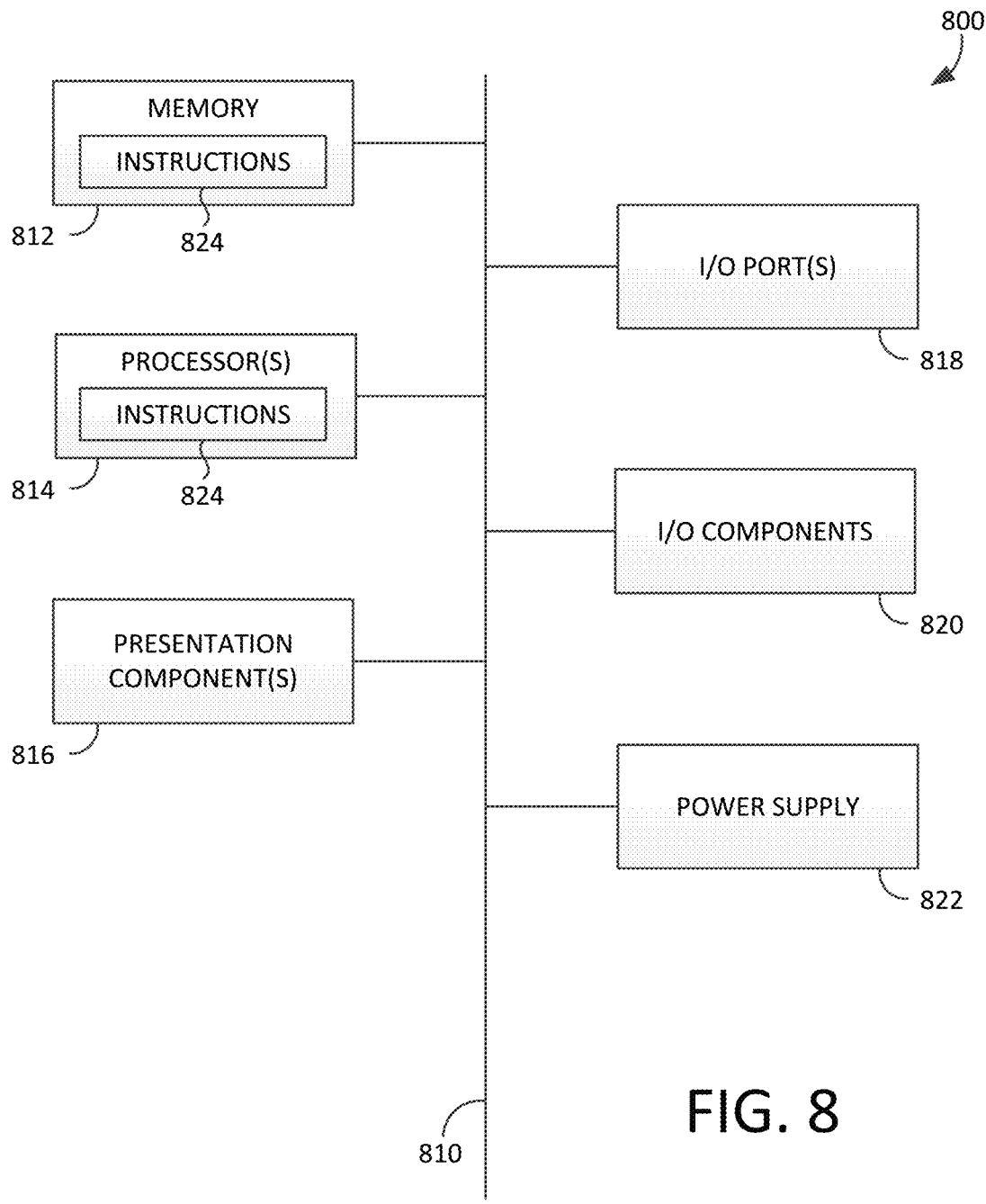
FIG. 8 is a block diagram of an example computing device in which embodiments of the present disclosure may be employed.

With reference to FIG. 8, computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 8 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 812 includes computer storage media in the form of volatile and/or nonvolatile memory. As depicted, memory 812 includes instructions 824. Instructions 824, when executed by processor(s) 814 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 800. Computing device 800 may be equipped with depth cameras, such as stereoscopic camera systems, infrared camera systems, RGB camera systems, and combinations of these, for gesture detection and recognition. Additionally, computing device 800 may be equipped with accelerometers or gyroscopes that enable detection of motion. The output of the accelerometers or gyroscopes may be provided to the display of computing device 800 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. One or more non-transitory computer-readable media having a plurality of executable instructions embodied thereon, which, when executed by one or more processors, cause the one or more processors to perform a method, the method comprising:
generating a meta-model based on a neural network trained using multiple binary classifiers for identifying individuals by classifying overall facial images of the individuals, wherein each of the binary classifiers is trained using a first facial image of one of the individuals, wherein a first binary classifier is trained using one facial image for a first individual to learn an identity for the first individual;
updating the meta-model by validating the meta-model to update for error in the meta-model, the error based on an output identity by the meta-model using a second facial image for the first individual input into the meta-model; and
utilizing the meta-model to identify a second individual based on a new facial image.

2. The media of claim 1, the method further comprising:
enrolling the second individual in a facial recognition system by inputting one image of the second individual into the facial recognition system such that the meta-model learns to classify the second individual.

3. The media of claim 1, the method further comprising:
testing the meta-model utilizing a third individual, the third individual different from the classifiers for identifying individuals for which the neural network is trained.

4. The media of claim 3, wherein testing the facial recognition system utilizes an unknown facial image of the third individual to fine-tune the meta-model based on further error.

5. The media of claim 1, wherein training the neural network further comprises:
during a first iteration, using the one facial image for the first individual, determining a first loss using a comparison between a first output and a first ground-truth output; and
adjusting the neural network based on the first loss.

6. The media of claim 5, wherein training the neural network further comprises:
during a second iteration, using a third facial image for the first individual, determining a second loss using a comparison between a second output and a second ground-truth output; and
adjusting the neural network based on the second loss.

7. The media of claim 1, wherein the error in the meta-model is determined using a binary entropy loss function.

8. The media of claim 1, further comprising:
further updating the meta-model, wherein the meta-model learns from additional trained iterations of the neural network;
testing the updated meta-model; and
repeating the further updating and the testing until output of the meta-model reaches a desired threshold minimum of loss.

9. A computer-implemented method for training a facial recognition system, the method comprising:
selecting an image with an individual to identify;
inputting the selected image into a trained facial recognition system implemented using a meta-model based on a neural network trained using multiple classifiers for identifying individuals by classifying overall facial images of the individuals, wherein each of the classifiers is trained using a single facial image of one of the individuals, wherein training the facial recognition system includes:
generating the meta-model based on the neural network, wherein the neural network is trained using a first classifier trained using one facial image for a first individual to learn an identity for the first individual,
updating the meta-model by validating the meta-model to update for error in the meta-model, the error based on an output identity by the meta-model using a second facial image for the first individual input into the meta-model, and
testing the meta-model to fine-tune the meta-model by for updating further error; and
outputting an identity for the individual in the image using the trained facial recognition system.

10. The computer-implemented method of claim 9, wherein the identity of the individual in the image is displayed via a user device.

11. The computer-implemented method of claim 9, further comprising:
enrolling an individual in the facial recognition system by inputting one image of the individual into the facial recognition system such that the meta-model learns an identity of the individual.

12. The computer-implemented method of claim 9, wherein the testing of the facial recognition system further comprises utilizing an unknown facial image as input into the meta-model to determine the further error.

13. The computer-implemented method of claim 9, wherein training the neural network further comprises:
during a first iteration, using the single facial image for the first individual, determining a first loss using a comparison between a first output and a first ground-truth output; and
adjusting the neural network based on the first loss.

14. The computer-implemented method of claim 13, the training further comprising:
during a second iteration, using a third facial image for the first individual, determining a second loss using a comparison between a second output and a second ground-truth output; and
adjusting the neural network based on the second loss.

15. The computer-implemented method of claim 9, wherein training the facial recognition system further comprises:
further updating the meta-model, wherein the meta-model learns from additional training iterations of the neural network;
further testing the facial recognition system implemented using the updated meta-model;
repeating the further updating and further testing until output of the facial recognition system reaches a desired threshold minimum of loss.

16. The computer-implemented method of claim 9, wherein the error in the meta-model is determined using a binary entropy loss function.

17. A computing system comprising:
means for training a facial recognition system, wherein the facial recognition system is implemented using a meta-model, the meta-model generated based on a neural network trained using multiple binary classifiers for identifying individuals by classifying overall facial images of the individuals, wherein each of the multiple binary classifiers is trained using a single facial image of one of the individuals; and
means for identifying an individual in an image using the trained facial recognition system, the trained neural network system implemented using the meta-model.

18. The system of claim 17, wherein the instructions further cause the computing system to provide:
means for updating the meta-model, wherein the meta-model learns from additional training iterations of the neural network.

19. The system of claim 17, wherein the instructions further cause the computing system to provide:
means for testing the meta-model to fine-tune the meta-model.

20. The system of claim 17, wherein the instructions further cause the computing system to provide:
means for outputting the identity of the individual in the image.

* * * * *